(12) United States Patent
Tamai (10) Patent No.: US 7,929,572 B2
(45) Date of Patent: Apr. 19, 2011

(54) CODE DIVISION MULTIPLEX SIGNAL TRANSMITTER AND CODE DIVISION MULTIPLEXING METHOD WITH AMPLIFYING CIRCUITS REDUCED IN NUMBER

(75) Inventor: Hideaki Tamai, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 85 days.

(21) Appl. No.: 12/458,687

(22) Filed: Jul. 20, 2009

(65) Prior Publication Data
US 2010/0067550 A1    Mar. 18, 2010

(30) Foreign Application Priority Data

Sep. 18, 2008    (JP) .................................. 2008-239433

(51) Int. Cl.
*H04J 13/00*    (2006.01)
(52) U.S. Cl. ........................................ 370/479; 375/295
(58) Field of Classification Search .................. 370/208, 370/479; 375/295
See application file for complete search history.

(56) References Cited

U.S. PATENT DOCUMENTS

| | | | |
|---|---|---|---|
| 6,052,404 A | 4/2000 | Tiepermann | |
| 6,556,617 B1* | 4/2003 | Tsujimoto | 375/141 |
| 2003/0152051 A1 | 8/2003 | Odenwalder | |
| 2004/0047330 A1 | 3/2004 | Matsuno et al. | |
| 2004/0097215 A1* | 5/2004 | Abe et al. | 455/403 |
| 2005/0259568 A1* | 11/2005 | Yeh et al. | 370/208 |
| 2010/0002799 A1* | 1/2010 | Tamai | 375/295 |

FOREIGN PATENT DOCUMENTS

DE    19708626 A1    9/1998

* cited by examiner

*Primary Examiner* — Albert T Chou
(74) *Attorney, Agent, or Firm* — Rabin & Berdo, P.C.

(57) ABSTRACT

N channels of encoded data are added into added data, which is compared with a first threshold of $2^{M-1}-A$ and a second threshold of $2^{M-1}-1$, where M is the number of the bit positions of the binary representation of N and A is defined by $2^M-(N+1)$. When the added data is less than the first threshold, it is selected. When the added data falls between the first and second thresholds, inclusive, either the added data or shifted data, obtained by adding A to the added data, is selected. When the added data exceeds the second threshold, the shifted data is selected. Based on output data representing the values of the respective bit positions of the binary representation of the selected data, the k-th output data, where k is a natural number less than M, is amplified into k-th amplified data having an amplitude level of $2^{k-1}$, and the M-th output data is amplified into M-th amplified data having an amplitude level of $2^{M-1}-A$. The first to M-th amplified data are multiplexed into a CDM signal.

3 Claims, 10 Drawing Sheets

| ADDED DATA $i$ | NON-SHIFTED DATA | | SHIFTED DATA |
| --- | --- | --- | --- |
| | $i_a$ | $Q_{a0}(i), Q_{a1}(i), \ldots, Q_{aM-1}(i), Q_{aM}(i)$ | $i_s$ | $Q_{s0}(i), Q_{s1}(i), \ldots, Q_{sM-1}(i), Q_{sM}(i)$ |
| 0 | 0 | 0, 0, ..., 0, 0 | | |
| 1 | 1 | 1, 0, ..., 0, 0 | | |
| 2 | 2 | 0, 1, ..., 0, 0 | | |
| ... | ... | ... | | |
| $2^{M-1}-A-1$ | $2^{M-1}-2$ | 0, 1, ..., 1, 0 | | |
| $2^{M-1}-A$ | $2^{M-1}-1$ | 1, 1, ..., 1, 0 | | |
| $2^{M-1}-A+1$ | | | $2^{M-1}$ | 0, 0, ..., 0, 1 |
| ... | | | ... | ... |
| $2^{M-1}-2$ | | | $2^{M-1}+1$ | 1, 0, ..., 0, 1 |
| $2^{M-1}-1$ | | | ... | ... |
| $2^{M-1}$ | | | | |
| ... | | | ... | ... |
| $N-1$ | | | $2^M-2$ | 0, 1, ..., 1, 1 |
| $N$ | | | $2^M-1$ | 1, 1, ..., 1, 1 |

FIG. 8

| i | P(i) | $Q_0(i)$, | $Q_1(i)$ |
|---|------|-----------|----------|
| 0 | 1/8  | 0 | 0 |
| 1 | 3/8  | 1 | 0 |
| 2 | 3/8  | 0 | 1 |
| 3 | 1/8  | 1 | 1 |

FIG. 9

| i | P(i) | $Q_0(i)$, | $Q_1(i)$, | $Q_2(i)$ |
|---|------|-----------|-----------|----------|
| 0 | 1/16 | 0 | 0 | 0 |
| 1 | 1/4  | 1 | 0 | 0 |
| 2 | 3/8  | 0 | 1 | 0 |
| 3 | 1/4  | 1 | 1 | 0 |
| 4 | 1/16 | 0 | 0 | 1 |

| i | P(i) | NON-SHIFTED DATA | | | | SHIFTED DATA | | | | |
|---|---|---|---|---|---|---|---|---|---|---|
| | | $i_a$ | $P_a(i)$ | $Q_{a0}(i)$, | $Q_{a1}(i)$, | $Q_{a2}(i)$ | $i_s$ | $P_s(i)$ | $Q_{s0}(i)$, | $Q_{s1}(i)$, | $Q_{s2}(i)$ |
| 0 | 1/16 | 0 | 1/16 | 0 | 0 | 0 | | | | | |
| 1 | 1/4 | 1 | 1/8 | 1 | 0 | 0 | 4 | 1/8 | 0 | 0 | 1 |
| 2 | 3/8 | 2 | 3/16 | 0 | 1 | 0 | 5 | 3/16 | 1 | 0 | 1 |
| 3 | 1/4 | 3 | 1/8 | 1 | 1 | 0 | 6 | 1/8 | 0 | 1 | 0 |
| 4 | 1/16 | | | | | | 7 | 1/16 | 1 | 1 | 1 |

FIG. 12 PRIOR ART

CODE DIVISION MULTIPLEX SIGNAL TRANSMITTER AND CODE DIVISION MULTIPLEXING METHOD WITH AMPLIFYING CIRCUITS REDUCED IN NUMBER

BACKGROUND OF THE INVENTION

1. Field of the Invention

The present invention relates to a code division multiplex signal transmitter and a code division multiplexing method for use in a transmission side of code division multiplex communication.

2. Description of the Background Art

Code division multiplexing (CDM) technology is used for a telecommunications network system, which can multiplex a plurality of data to be transmitted in a time slot. Since the CDM technology can be used to transmit a large amount of data while saving a communications resource such as time slots, it has mainly been put to practical use for mobile communications.

Figure 12:
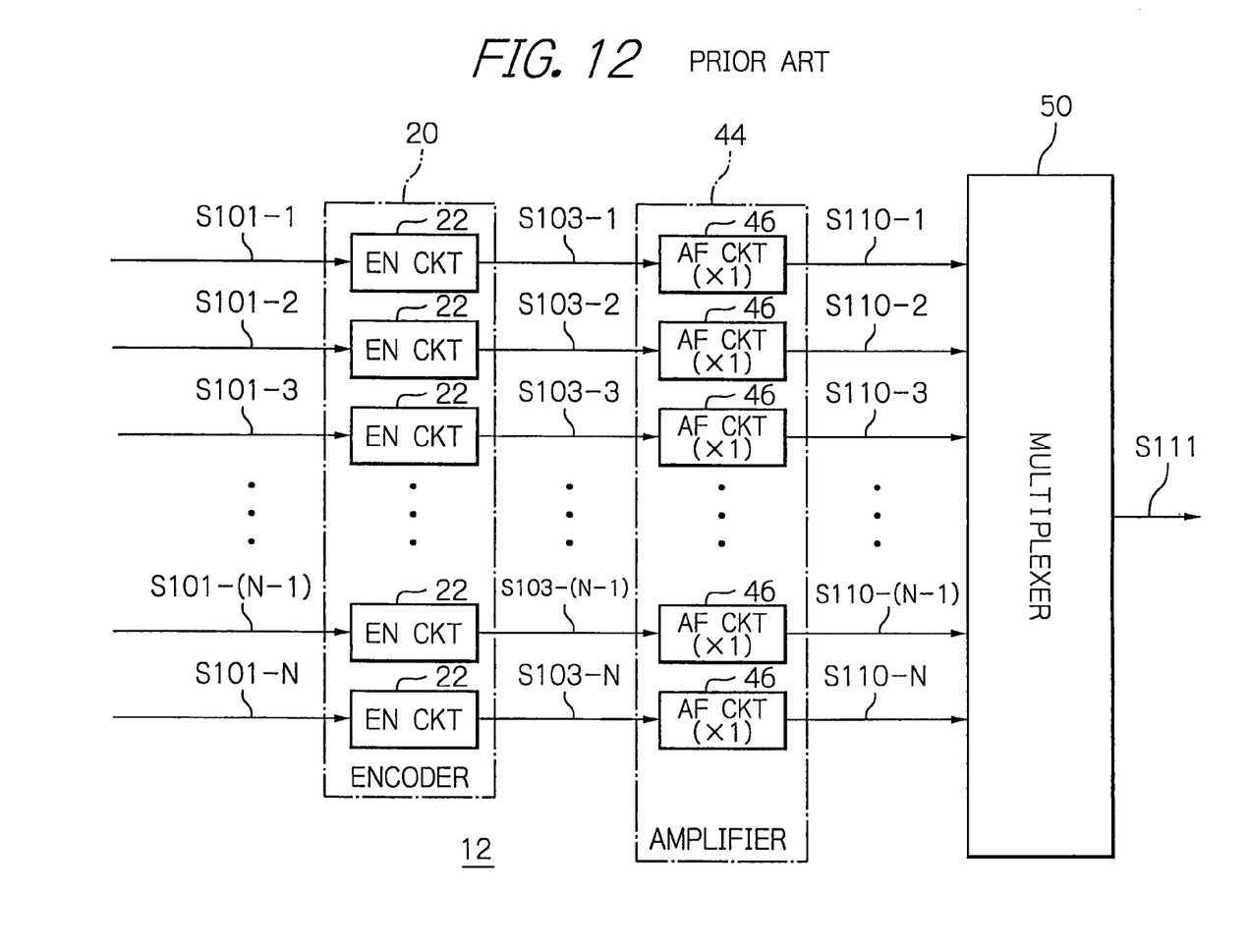
FIG. 12 is a schematic block diagram showing a configuration of a conventional code division multiplex signal transmitter.

With reference to FIG. 12, an exemplified conventional CDM signal transmitter for use in CDM communication will be described. FIG. 12 is a schematic block diagram showing the exemplified conventional CDM signal transmitter disclosed in U.S. patent application publication No. US 2004/0047330 A1 to Matsuno et al., for example.

The CDM signal transmitter 12 receives a plurality (N) of channels of data S101-1, S101-2, S101-3, . . . , S101-(N–1) and S101-N to be transmitted, where N is a natural number. The data to be transmitted S101-1 to S101-N are respectively encoded to data S103-1 to S103-N by encoding circuits (EN CKT) 22 included in an encoder 20 with codes of their corresponding channels. Each encoded data S103-1, S103-2, S103-3, . . . , S103-(N–1) or S103-N is a binary signal taking its value equal to binary "0" or "1", and is sent to an amplifier 44.

The amplifier 44 includes amplifying circuits 46, the number of which is equal to the number N of the channels. The amplifying circuits 46 amplify the amplitude of the encoded data S103-1 to S103-N to develop amplified signals S110-1, S110-2, S110-3, . . . , S110-(N–1) and S110-N, respectively. In this exemplified conventional CDM signal transmitter 12, all the amplifying circuits 46 amplify the encoded data with a common ratio so that the amplified signals S110-1 to S110-N have the amplitude levels equal to each other. The amplified signals S110-1 to S110-N developed by the amplifier 44 are sent to a multiplexer 50.

The multiplexer 50 multiplexes the amplified signals S110-1 to S110-N to produce a code division multiplex signal S111. The code division multiplex signal S111 obtained from the N channels of data to be transmitted S101-1 to S101-N will be an (N+1)-valued signal taking any one of the values 0, 1, 2, . . . , N.

The exemplified conventional CDM signal transmitter described above thus requires amplifying circuits, the number of which is equal to the number N of the channels of data to be transmitted. Therefore, an increase in the number N of the channels leads to an increase in number of amplifying circuits, thus increasing the cost for the components. In addition, it increases the size of circuitry in the multiplexer so that it is difficult to manufacture it.

SUMMARY OF THE INVENTION

It is therefore an object of the present invention to provide a CDM signal transmitter with the number of amplifying circuits decreased to thereby reduce the cost for components and the size of the circuitry of the transmitter, and to provide a CDM method therefor.

Thus, the inventor of the present invention has found that the number of amplifying circuits can be reduced by adding up all N channels of data to be transmitted to produce added data, and then amplifying pieces of output data which are equal in number to the bit positions of the added data, when represented in binary form, each of the pieces of output data representing the binary value of corresponding one of the bits.

In accordance with the present invention, a code division multiplex signal transmitter comprises an arithmetic processor, an amplifier, and a multiplexer. The arithmetic processor produces, from N channels of encoded data, where N is a natural number more than unity, pieces of output data, the number of which is equal to the number M of the bit positions of the binary representation of the number N, where M is a natural number. The amplifier comprises amplifying circuits, of which the number is equal to the number M. The k-th amplifying circuit amplifies the k-th output data, where k is a natural number less than M, to output the k-th amplified data having an amplitude level of $2^{k-1}$, and the M-th amplifying circuit outputs the M-th amplified data having an amplitude level of $2^{M-1}-A$, where A is an offset-adjusting value given by $A=2^M-(N+1)$. A multiplexer multiplexes the first to M-th amplified data to develop a code division multiplex signal. The arithmetic processor adds up the encoded data to produce added data. When the added data is less than a first threshold value of $2^{M-1}-A$, the arithmetic processor produces the first to M-th output data representing the values of the respective bit positions of the binary representation of the added data. When the added data is equal to or more than the first threshold value of $2^{M-1}-A$ but is equal to or less than a second threshold value of $2^{M-1}-1$, the arithmetic processor selects either the added data or shifted data, obtained by adding the offset-adjusting value A to the added data, at an equal probability to produce the first to M-th output data representing the values of the respective bit positions of the binary representation of the added data or shifted data thus selected. When the added data is more than the second threshold value of $2^{M-1}-1$, the arithmetic processor produces the first to M-th output data representing the values of the respective bit positions of the binary representation of the shifted data.

In an aspect of the present invention, the arithmetic processor preferably may comprise an adder, comparator, switcher, data shifter, and bit distributor. The adder adds up the N channels encoded data to produce the added data to send the added data to the comparator and the switcher. The comparator compares the added data with the first threshold value of $2^{M-1}-A$ and the second threshold value of $2^{M-1}-1$ to send the result of the comparison to the switcher. The switcher sends the added data to the bit distributor when the added data is less than the first threshold value of $2^{M-1}-A$, sends the added data to either the data shifter or the bit distributor at an equal probability when the added data is equal to or more than the first threshold value of $2^{M-1}-A$ but is equal to or less than the second threshold value of $2^{M-1}-1$, and sends the added data to the data shifter when the added data is more than the second threshold value of $2^{M-1}-1$. The data shifter adds the offset-adjusting value A to the added data to produce the shifted data to send the shifted data to the bit distributor. The bit distributor develops the first to M-th output data representing the values of the respective bit positions of the binary representation of the non-shifted data or shifted data, where non-shifted data is sent directly from the switcher to the bit distributor.

Further in accordance with the present invention, a code division multiplexing method comprises the following steps. First, N channels of inputted encoded data are added up to produce added data. Next, the added data is compared with a first threshold value of $2^{M-1}-A$ and a second threshold value of $2^{M-1}-1$, where M is the number of the bit positions of the binary representation of the number N and A is an offset-adjusting value given by $A=2^M-(N+1)$. According to the result of the comparison, when the added data is less than the first threshold value of $2^{M-1}-A$, the first to M-th output data are produced, which represent the values of the respective bit positions of the binary representation of the added data. When the added data is equal to or more than the first threshold value of $2^{M-1}-A$ but is equal to or less than the second threshold value of $2^{M-1}-1$, either the non-shifted data or shifted data, obtained by adding the offset-adjusting value A to the added data, is selected at an equal probability to produce the first to M-th output data representing the values of the respective bit positions of the binary representation of the non-shifted data or shifted data thus selected. When the added data is more than the second threshold value of $2^{M-1}-1$, the first to M-th output data representing the values of the respective bit positions of the binary representation of the shifted data are produced. Next, the k-th output data is amplified to output the k-th amplified data having an amplitude level of $2^{k-1}$, where k is a natural number less than M, and the M-th output data is amplified to output the M-th amplified data having an amplitude level of $2^{M-1}-A$. Next, the first to M-th amplified data are multiplexed to develop a code division multiplex signal.

Thus, in accordance with the code division multiplex signal transmitter and the code division multiplexing method of the present invention, N channels of data to be transmitted are added up to thereby produce added data, and pieces of output data are amplified, of which the number is equal to the number M of the bit positions of the binary representation of the number N. That configuration makes the number of necessary amplifying circuits reduced to the number M, which is so much fewer than conventional CDM transmitters.

Specifically, in contrast to the number N, the number M is given as the minimum integer satisfying the relationship, $N+1 \leq 2^M$, where $M \geq \log_2(N+1)$. For example, four amplifying circuits are sufficient for the N channels when N is equal to 15. In addition, each string of output data has its mark ratio equal to 0.5, which can prevent its DC offset from being caused.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

A preferred embodiment in accordance with the present invention will be described below with reference to the accompanying drawings. In the drawings, the components and elements are merely schematically depicted to the extent that the present invention can be appreciated. Preferred exemplary configurations of the present invention will be described below, but are merely preferred examples. Therefore, the present invention is not to be restrictively comprehended by the following embodiment. The embodiment can be variously changed or modified so as to provide advantages of the present invention without departing from the scope and spirit of configurations of the present invention.

Figure 1:
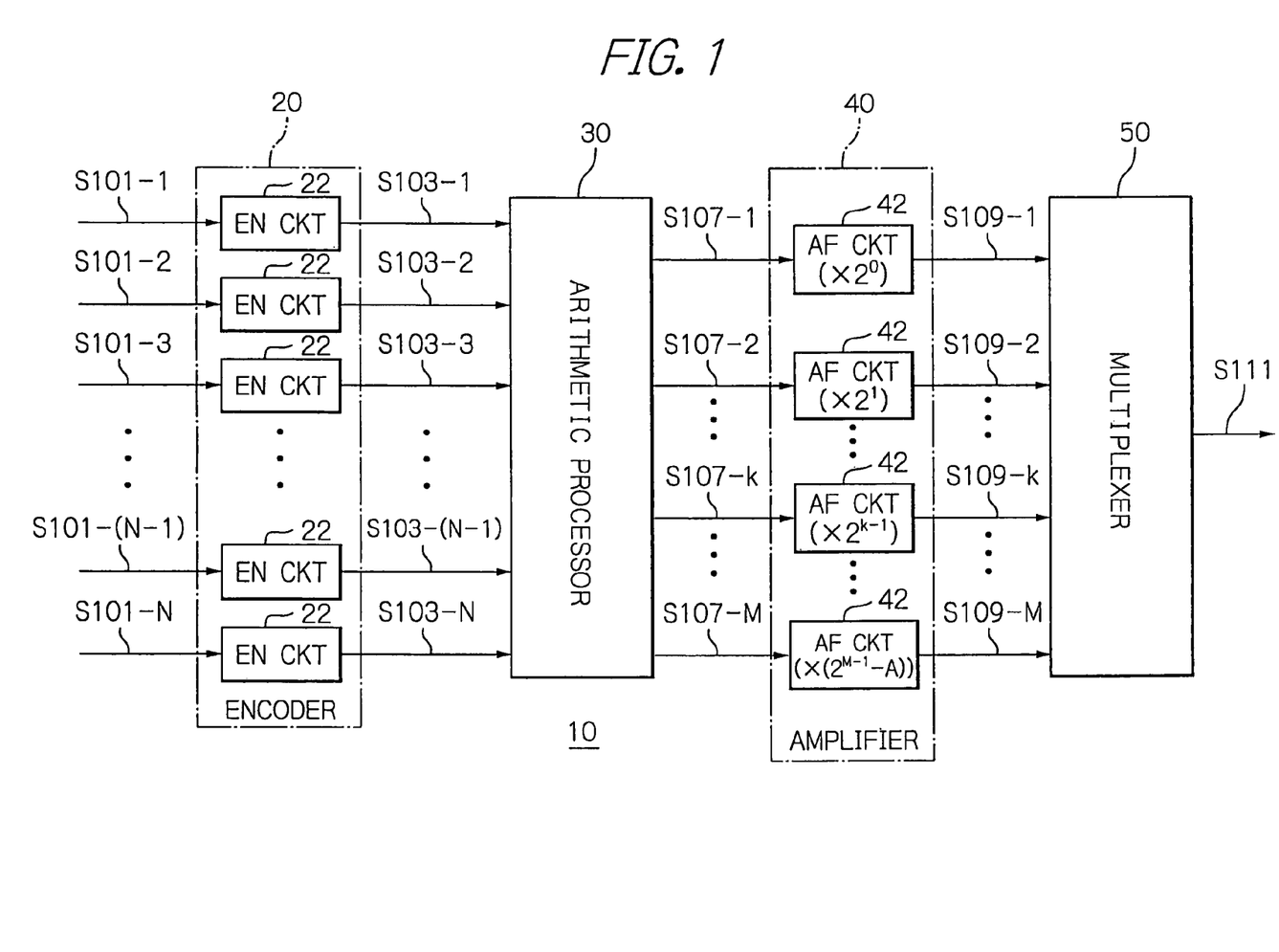
FIG. 1 is a schematic block diagram showing a configuration of a code division multiplex signal transmitter in accordance with a preferred embodiment of the present invention.
Figure 2:
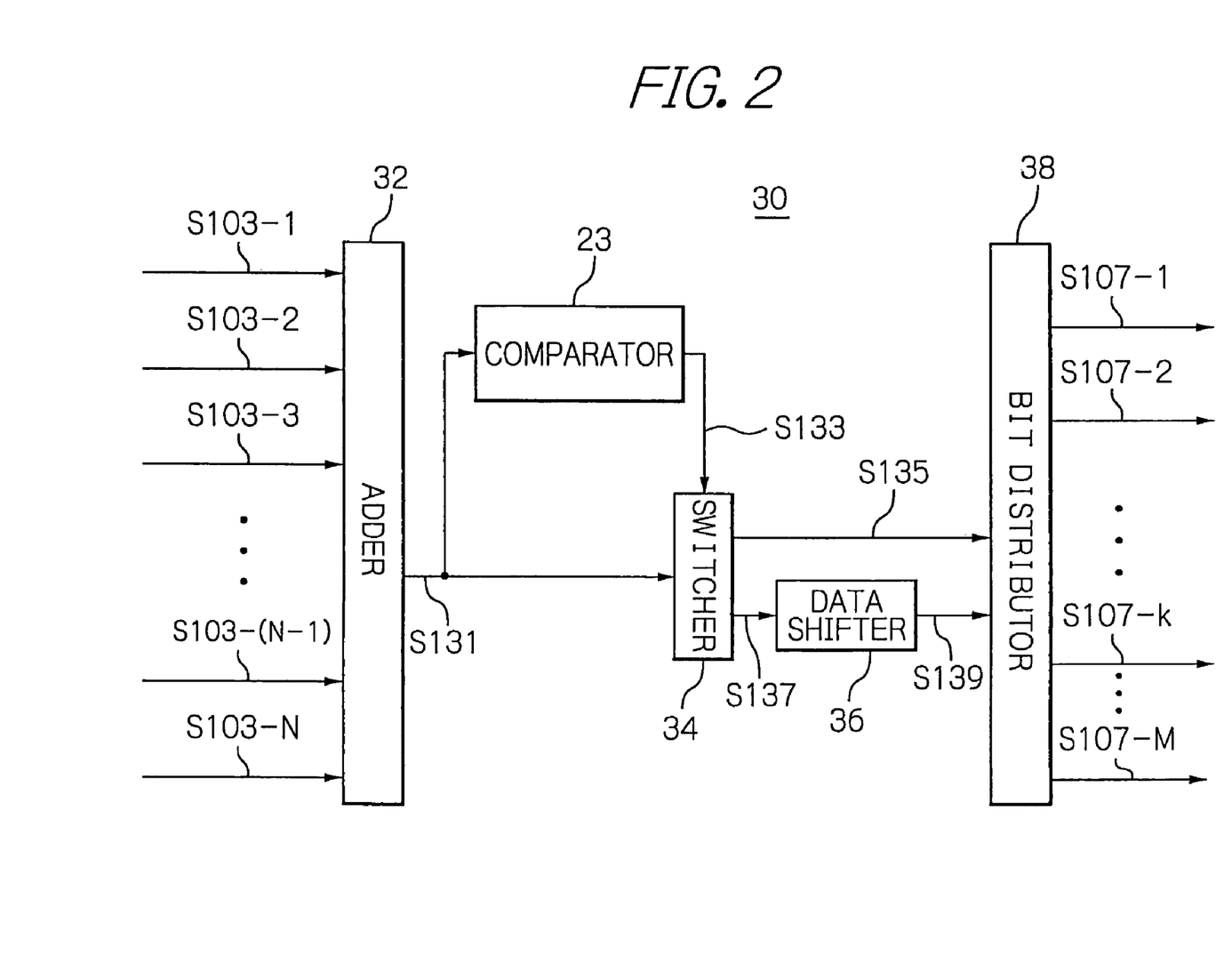
FIG. 2 is a schematic block diagram of an arithmetic processor in the embodiment shown in FIG. 1.

With reference to FIGS. 1 and 2, a Code Division Multiplexing (CDM) signal transmitter 10 in accordance with the present invention will be described. FIG. 1 is a schematic diagram showing an exemplified configuration of the CDM signal transmitter 10 in accordance with the present invention. FIG. 2 is a schematic block diagram showing an exemplified configuration of an arithmetic processor 30 included in the transmitter 10.

The CDM signal transmitter 10 according to the embodiment is adapted to receive a plurality (N) of channels of data to be transmitted, where N is a natural number more than unity, to develop a CDM signal S111. Signals are designated with reference numerals of connections on which they are conveyed.

As shown in FIG. 1, the CDM signal transmitter 10 comprises an encoder 20, an arithmetic processor 30, an amplifier 40, and a multiplexer 50, which are inter connected as illustrated. Like components are designated with the same reference numerals.

The encoder 20 is adapted to receive the N channels of data S101-1, S101-2, S101-3, . . . , S101-(N−1) and S101-N inputted to the CDM signal transmitter 10 to encode them. The encoder 20 comprises encoding circuits (EN CKT) 22, the number of which is equal to the number N of the channels. Each of the encoding circuits 22 has its own code specific or unique thereto so that the encoding circuits 22 encode the respective, inputted data S101-1 to S101-N to produce resultant encoded data S103-1, S103-2, S103-3, . . . , S103-(N−1) and S103-N. The encoded data S103-1 to S103-N are produced by code-spreading the data to be transmitted S101-1 to S101-N, and include chips, the number of which is associated with the length of a code and which have the binary value thereof equal to either "0" or "1". The encoder 20 sends the encoded data S103-1 to S103-N to the arithmetic processor 30.

The encoding circuits 22 may be of the same configuration as an encoding circuit generally used for a telecommunications system using CDM technology, thus a detailed description thereon being omitted.

The arithmetic processor 30 is adapted to arithmetically process the encoded data S103-1 to S103-N so as to produce M pieces of output data, where M is a natural number equal to the number of bit positions of a binary number representing the number (N) of the channels. The number M is obtained as the minimum integer satisfying the relation $N+1 \leq 2^M$. For example, when the number N of the channels is equal to 15, the number M is equal to four.

As shown in FIG. 2, the arithmetic processor 30 in the embodiment comprises as functional means an adder 32, a comparator 33, a switcher 34, a data shifter 36, and a bit distributor 38, which are interconnected as depicted. The functional means of the arithmetic processor 30 can be implemented by, for example, an FPGA (Field Programmable Gate Array).

The adder 32 is adapted to add up the encoded data S103-1 to S103-N inputted to the arithmetic processor 30 in time with the respective chips to produce resultant, added data S131 and send it to the comparator 33 and the switcher 34.

Each of the encoded data S103-1 to S103-N is represented by a binary value of "0" or "1". Therefore, the added data S131 is an (N+1)-valued signal having any one of the values from "0" to "N", inclusive.

Figure 3:
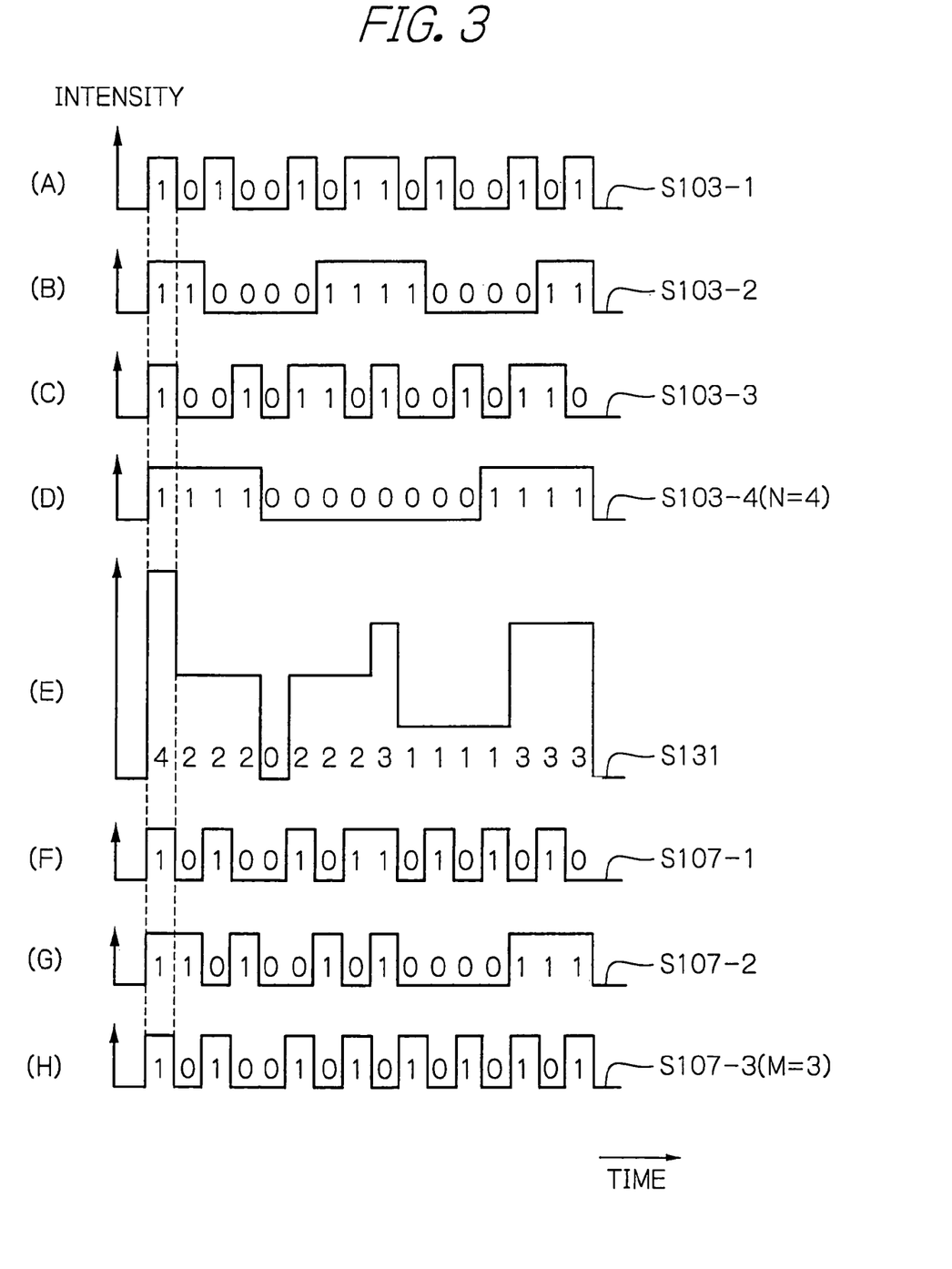
FIG. 3 is a timing chart useful for understanding relationships between encoded data and added data and between added data and output data dealt with by the embodiment.

With reference to FIG. 3, the adder 32 will be described more specifically. FIG. 3 is directed to an example in the embodiment, where N is equal to "4". Thus, in FIG. 3, lines (A), (B), (C) and (D) show the strings of first to fourth encoded data S103-1, S103-2, S103-3 and S103-N, respectively.

The strings of first to fourth encoded data S103-1, S103-2, S103-3 and S103-N are "1010010110100101", "1100001111000011", "1001011010010110" and "1111000000001111" as shown in FIG. 3, lines (A), (B), (C) and (D), respectively.

The adder 32 adds up the first to fourth encoded data S103-1 to S103-N, respectively, in time with the respective chips to obtain the added data S131. The string of added data S131 is found to be "4222022231111333" as shown in FIG. 3, line (E).

The comparator 33 is adapted to compare each value i of the added data S131 with a first and a second threshold value. In this embodiment, the first and second threshold values are respectively given as $2^{M-1}-A$ and $2^{M-1}-1$, where A is an offset-adjusting value given by $A=2^M-(N+1)$. The comparator 33 sends information S133 on the result of the comparison to the switcher 34.

For the purpose of description only, cases 1, 2 and 3 will respectively be referred to when the value i of the added data is less than the first threshold value, $2^{M-1}-A$, when the value i is equal to or more than the first threshold value but is equal to or less than the second threshold value, $2^{M-1}-1$, and when the value i is more than the second threshold value.

The switcher 34 is adapted to be responsive to the information S133 on the result of the comparison to selectively send the added data S131 to the data shifter 36 or bit distributor 38. Specifically, in cases 1 and 3, the switcher 34 sends the added data S131 to the bit distributor 38 and the data shifter 36, respectively, as depicted with connections S135 and S137. In case 2, the switcher 34 sends the added data S131 to either the data shifter 36 or the bit distributor 38 at an equal probability. A destination to which of the data shifter 36 and the bit distributor 38 the added data S131 are sent in case 2 may be determined by using random numbers, or by alternately selecting the data shifter 36 and the bit distributor 38.

Figure 4:
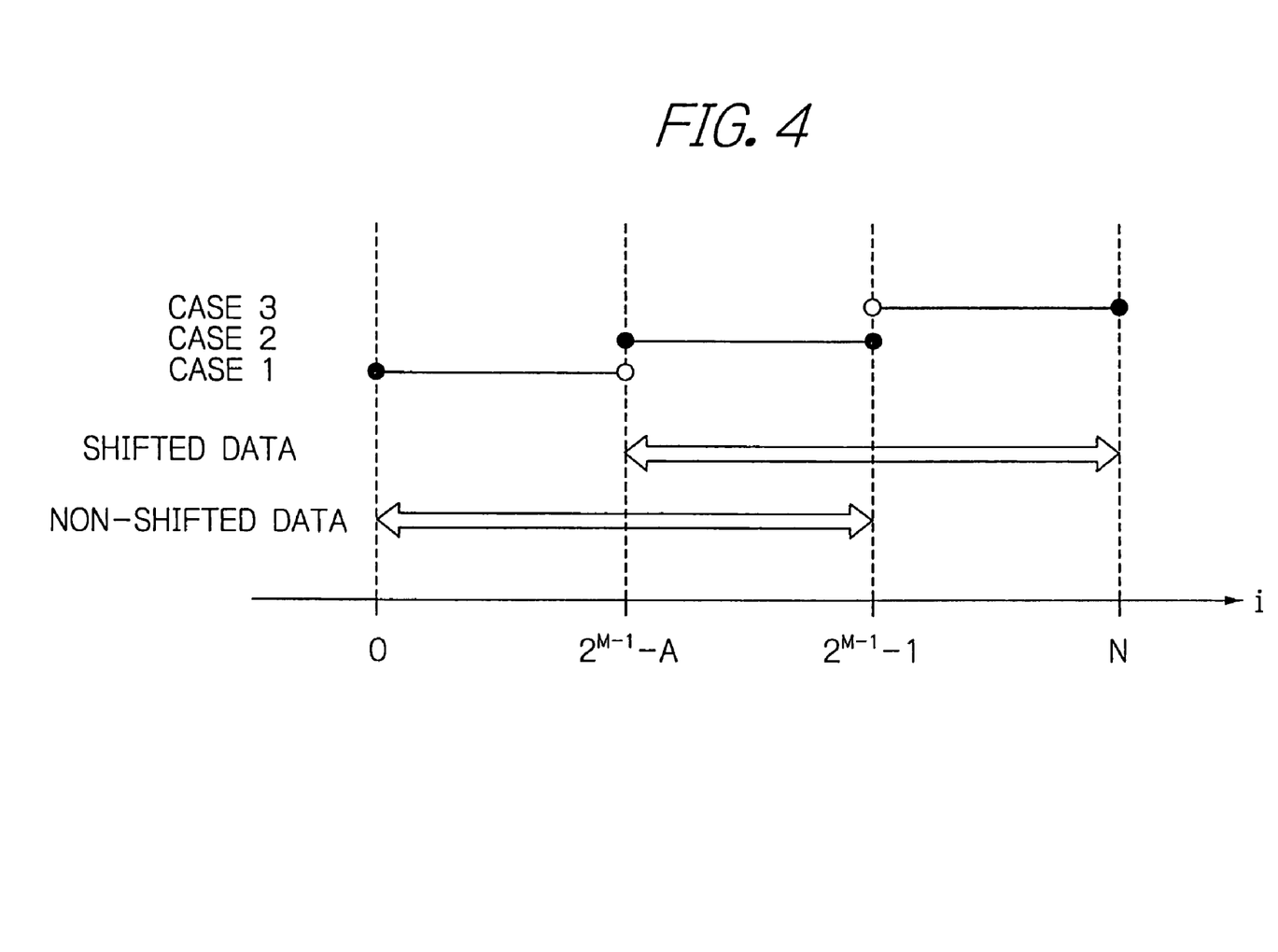
FIG. 4 is a diagram useful for understanding a switching method performed in the embodiment.

In the example shown in FIG. 4, where the number N of the channels is four and hence the number M of the bit positions of the corresponding binary number is three, the offset-adjusting value A is found to be "3" ($=2^M-(N+1)=2^3-(4+1)$). Therefore, the first threshold value is equal to "1", and the second threshold value is equal to "3".

In the case of the added data S131 less than the first threshold value of "1", i.e. case 1, the switcher 34 sends the added data S131 to the bit distributor 38 as data S135.

In the case of the added data S131 more than the second threshold value of "3", i.e. case 3, the switcher 34 sends the added data S131 to the data shifter 36 as data S137.

In the case of the added data i equal to more than the first threshold value of "1" but not exceeding the second threshold value of "3", i.e. case 2, the switcher 34 sends the added data S131 to either the data shifter 36 or the bit distributor 38 as the data S137 or S135, respectively.

The data shifter 36 is adapted to add the added data S131 with the offset-adjusting value A to produce resultant, shifted data S139. The data shifter 36 sends the resultant shifted data S139 to the bit distributor 38.

In the following description, the added data S135 sent from the switcher 34 to the bit distributor 38 without passing through the data shifter 36 may be referred to as non-shifted data.

As seen from FIG. 4, the added data in the range of "0" to $2^{M-1}-1$ can become non-shifted data and in the range of $2^{M-1}-A$ to N can become shifted data. Therefore, the value $i_a$ of the non-shifted data takes any one of the values equal to or more than "0" but not exceeding $2^{M-1}-1$, and the value $i_s$ of the shifted data takes any one of the values equal to or more than $2^{M-1}$ but not exceeding $N+A=2^{M-1}$.

When the number N of channels satisfies $N+1=2^M$, in other words, when the offset-adjusting value A is equal to "0", the comparator 33 always determines the case 1.

In the example shown in FIG. 3, the offset-adjusting value A is "3". Therefore, when the added data is "4", the value $i_s$ of its shifted data is found to be "7" ($="4"+"3"$).

The bit distributor 38 is adapted to produce output data S107-1, S107-2, . . . , S107-(M−1), and S107-M, which are equal in number to the bit positions (M) of the binary representation of the number N of the channels.

The output data S107-1, S107-2, . . . , S107-(M−1), and S107-M are electrical signals representing the binary values of the respective bit positions in the binary representation of the non-shifted or the shifted data S135 or S139. In other words, the first to M-th output data S107-1, S107-2, . . . , S107-(M−1), and S107-M respectively represent the values of $2^0$ to $2^{M-1}$'s place of the binary value of the data S135 or S139.

Figure 5:
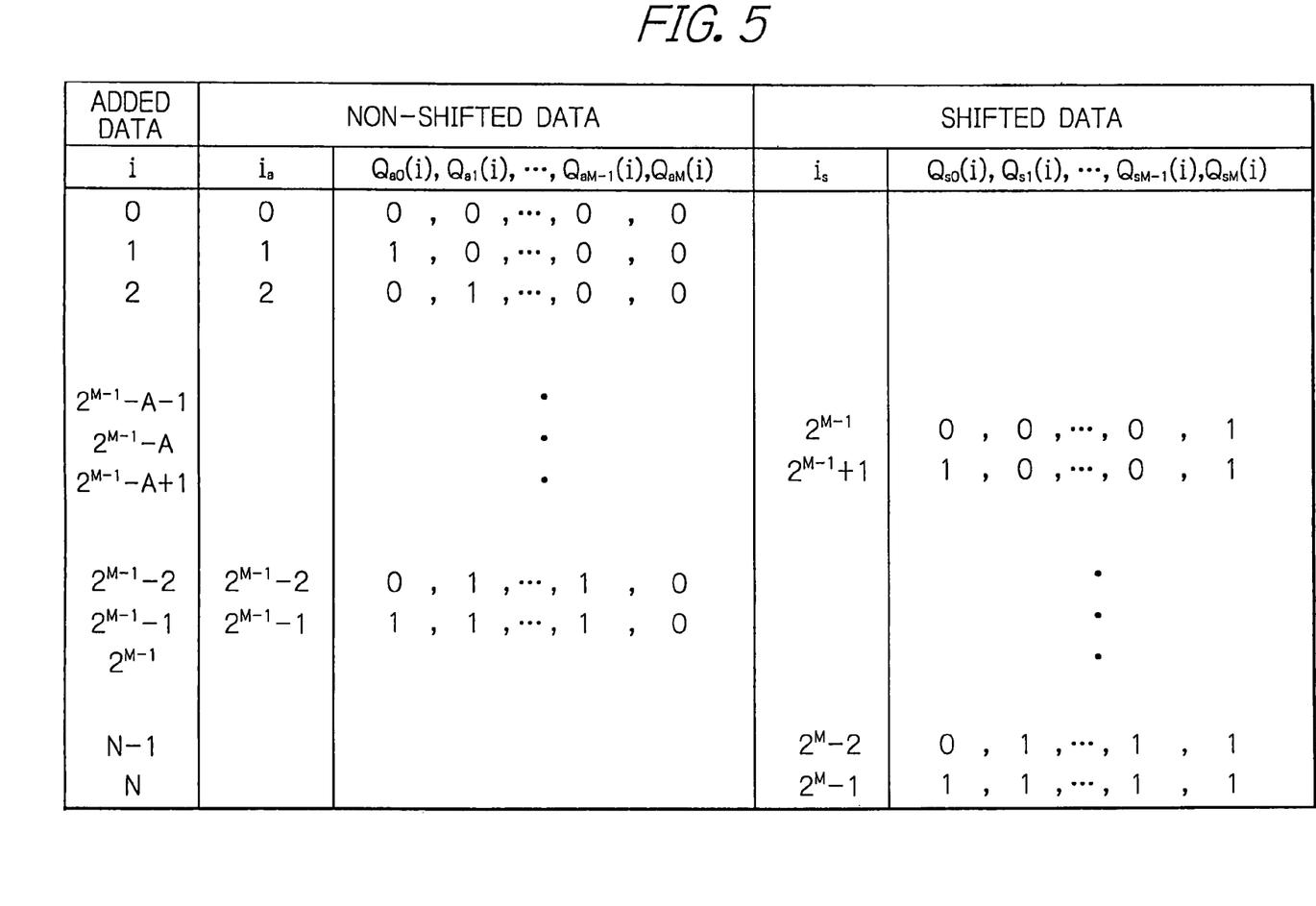
FIG. 5 shows a correspondence relation between the value i of added data and the bit values of non-shifted or shifted data.

FIG. 5 shows correspondence relation between the added data S131 and the output data S107-1, S107-2, . . . , S107-(M−1), and S107-M. In the figure, a value $Q_{aj}(i)$ represents the value of $2^j$'s place of the binary representation of the non-shifted data value $i_a$, where j is an integer equal to or more than "0" but not exceeding M, and a value $Q_{sj}(i)$ represents the value of $2^j$'s place of the binary representation of the shifted data value $i_s$.

More specifically, values $Q_{a0}(i)$, $Q_{a1}(i)$, and $Q_{a2}(i)$ are the values of $2^0$, $2^1$, and $2^2$'s place of the binary representation of the non-shifted data the value $i_a$, respectively, and values $Q_{s0}(i)$, $Q_{s1}(i)$, and $Q_{s2}(i)$ are the value of $2^0$, $2^1$, and $2^2$'s place of the binary representation of the shifted data value $i_s$.

Figure 6:
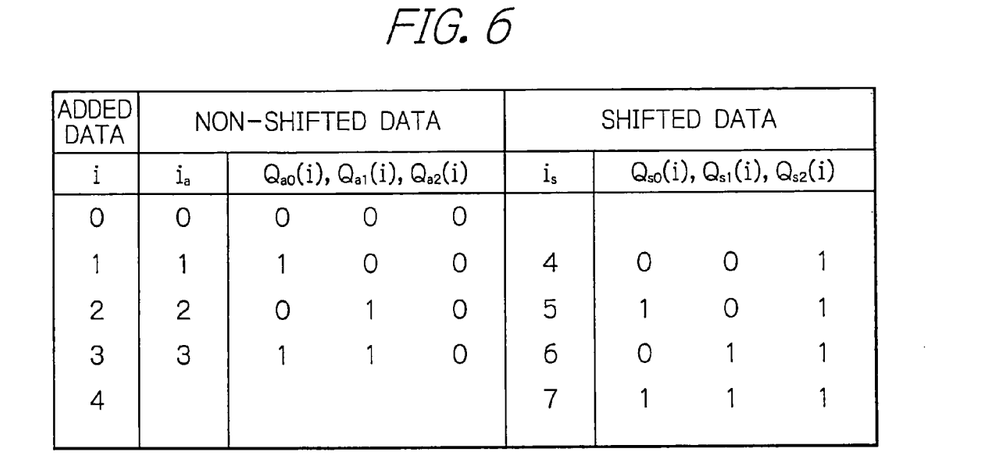
FIG. 6 shows an example of correspondence relation shown in FIG. 5.

With the example shown in FIG. 5, a correspondence relation between the value i of added data S131 and the output data S107-1, S107-2, and S107-M will be as shown in FIG. 6.

Specifically, when the value i of the added data S131 is "0", i.e. in case 1, each of the first to third output data S107-1, S107-2, and S107-M is found to be "0".

When the value i of the added data is "4", i.e. in case 3, each of the first to third output data S107-1, S107-2, and S107-M is found to be "1", because the offset-adjusting value A is "3" and the value $i_s$ of its shifted data is found to be "7" (="4"+"3").

Returning to FIG. 3, lines (F), (G) and (H) show the strings of first to third output data S107-1, S107-2, and S107-M, respectively, produced from the added data S131 shown in line (E). In this example, added data in case 2 will be non-shifted and shifted data alternately.

Therefore, the strings of output data S107-1, S107-2, and S107-M will be "1010010110101010", "1101001010000111" and "1010010101010101", respectively as shown in FIG. 3, lines (F) to (H).

The amplifier 40, FIG. 1, is adapted to amplify the output data S107-1, S107-2, . . . , S107-(M−1), and S107-M to develop resultant, amplified data. The amplifier 40 comprises amplifying circuits (AF CKT) 42-1, 42-2, . . . , 42-k and 42-M, of which the number is equal to the number M. Now, as seen from FIG. 1, the k-th amplifying circuit 42-k is arranged to amplify the k-th input data S107-k to develop a k-th amplified data S109-k having an amplitude level of $2^{k-1}$, where k is a natural number not exceeding M−1. The M-th amplifying circuit 42-M is adapted to produce an M-th amplified data S109-M having an amplitude level of $2^{M-1}-A$. These amplifying circuits send the first to M-th amplified data S109-1 to S109-M to the multiplexer 50.

Figure 7A:
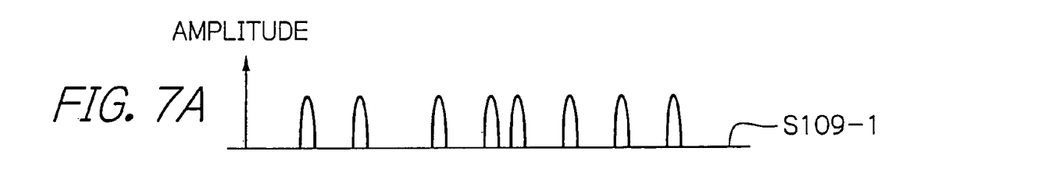
FIGS. 7A through 7D are timing charts useful for understanding relationships between amplified data and a code division multiplex signal in the embodiment.
Figure 7B:
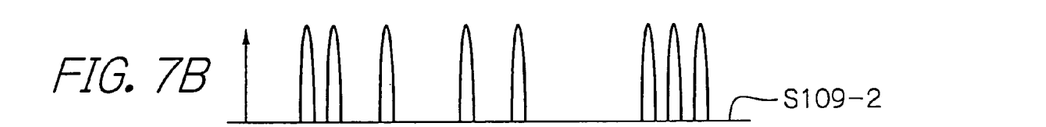
Figure 7C:
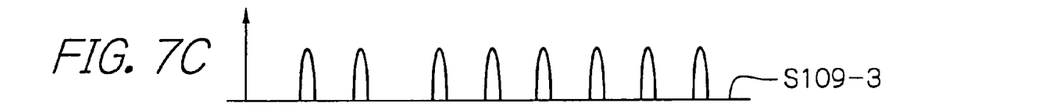

With the example shown FIG. 3, where M is equal to three, the first, second and third amplifying circuits 42-1, 42-2 and 42-M produces amplified data whose amplitude levels are amplified to $1(=2^0)$, $2(=2^1)$ and $1(=2^2-3)$-fold, respectively. Therefore, these amplifying circuits 42-1, 42-2 and 42-M amplify output data S107-1, S107-2, and S107-M in FIG. 3, lines (F), (G) and (H) to the amplified data S109-1, S109-2 and S109-M as shown in FIGS. 7A, 7B and 7C, respectively.

In addition, since the first to M-th amplifying circuits 42-1 to 42-M simply need to have a function capable of amplifying a signal into desired amplitude, those skilled in the art can readily practice such amplifying circuits per se by known conventional technology.

The multiplexer 50 is adapted to multiplex the first to M-th amplified data S109-1, S109-2, . . . , S109-k, . . . , S109-M to develop a code division multiplex signal S111.

Figure 7D:
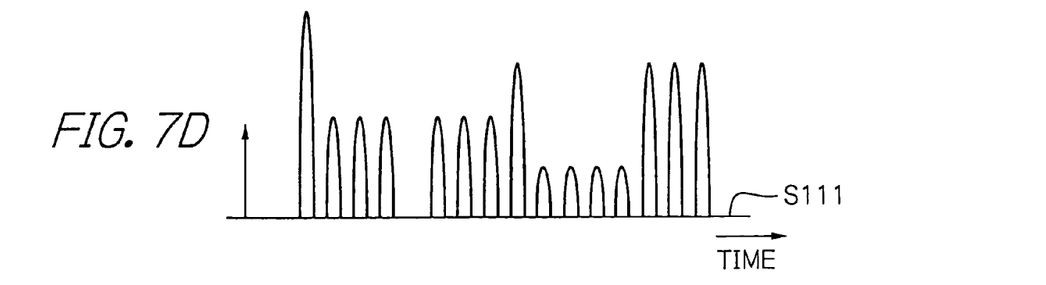

With the example shown in FIG. 7A to 7D, the multiplexer 50 multiplexes the first to third amplified data S109-1, S109-2 and S109-M to develop the CDM signal S111 as shown in FIG. 7D. The amplitude level of the CDM signal S111 falls in the range of "0" to "4".

Next, operations of the CDM signal transmitter 10 will be described. The data to be transmitted S101-1 to S101-N are inputted into the CDM signal transmitter 10. Each data is encoded by corresponding one of the encoding circuits 22 in the encoder 20. The encoded data S103-1 to S103-N are inputted into the arithmetic processor 30.

In the arithmetic processor 30, the encoded data S103-1 to S103-N are added up by the adder 32, FIG. 2. The resultant value i is sent in the form of added data S131 to the comparator 33 and switcher 34. In the comparator 33, the added data S131 is compared to the first and second threshold values, thereby the result of the comparison being obtained. The information S133 on the result of the comparison is sent to the switcher 34. Depending on the information S133, the added data S131 is sent to the bit distributor 38 directly as non-shifted data S131 or via the data shifter 36 to become shifted data S139. In the data shifter 36, the added data S131 is added to the offset-adjusting value A to produce the shifted data S139. In the bit distributor 38, the non-shifted or shifted data S135 or S139 is converted into the output data S107-1, S107-2, . . . , S107-(M−1), and S107-M, each of which represents the value of its corresponding $2^j$'s place of the binary representation of the value $i_a$ or $i_s$, where the values $i_a$ and $i_s$ represent the value of the non-shifted and shifted data, respectively.

The output data S107-1, S107-2, . . . , S107-(M−1), and S107-M are sent to the amplifier 40, FIG. 1, and amplified by the amplifying circuits 42-1, 42-2, . . . , 42-k, . . . , 42-M. These amplified data are sent to the multiplexer 50 in the form of amplified data S109-1, S109-2, . . . , S109-k, . . . , S109-M.

In the multiplexer 50, the amplified data are multiplexed together to produce the code division multiplex signal S111.

As described above, the code division multiplex signal transmitter in accordance with the embodiment of the present invention is thus configured in which N channels of data to be transmitted are added up to obtain added data, and then amplifying pieces of output data which are equal in number to the bit positions of the added data, when represented in binary form, each of the pieces of output data representing the binary value of a corresponding bit of the binary data.

With the configuration of the illustrative embodiment described above, the number of amplifying circuits can be reduced, since the number of necessary amplifying circuits is equal to the number M of bit positions of the binary representation of the added data. In contrast to the number N of channels, since the number M of bit positions of the binary data is given as the minimum integer satisfying the relationship $N+1 \leq 2^M$, for example, four amplifying circuits are sufficient for the transmitter dealing with fifteen channels when N=15. In addition, since the number of signals multiplexed by the multiplexer 50 decreases, the size of the circuitry of the multiplexer 50 can be reduced.

Next, the offset-adjusting value A will be described. First, the case of A=0, in other words, the case of not using the offset-adjusting value A will be described.

The first to N-th encoded data S103-1, S103-2, S103-3, . . . , S103-(N−1), S103-N are added to produce resultant, added data S131, which has an amplitude level i that is assumed to appear at a probability P(i), where i is an integer equal to or more than 0 but not more than N. Now, for a signal having either "0" or "1" of the binary values, the probability of appearance of binary "1" is referred to as a mark ratio r. At this time, assuming that all the first to N-th encoded data S103-1 to S103-N have the mark ratio r equal to 0.5, then P(i) is represented by $P(i) = {}_N C_i / 2^N$, since P(i) is defined by the binomial distribution.

When the amplitude level i is represented in the form of binary number and the value of its $2^j$'s place is referred to as a value $Q_j(i)$, where j is an integer equal to or more than 0 but not more than i, the mark ratio $r_j$ of each of the first to M-th output data S107-1, S107-2, . . . , S107-(M−1), and S107-M is represented by the following expression (1):

$$r_j = \sum_{i=0}^{N} P(i) Q_j(i). \tag{1}$$

Figure 8:
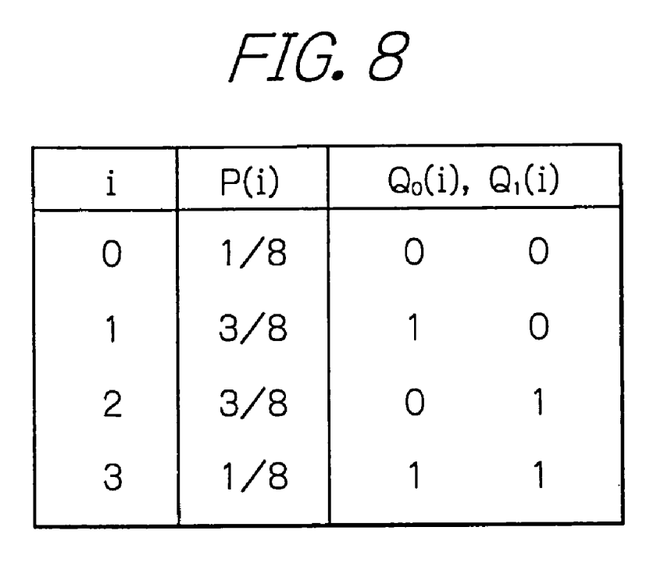
FIGS. 8 and 9 show examples of relationship between amplitude levels of added data, the probability of appearance of the amplitude level and output data, where an offset-adjusting value is not introduced.

FIG. 8, where the number N of channels equal to three, shows the relationship between the amplitude level i, the probability P(i) of appearance of the amplitude level i and the values $Q_0(i)$ and $Q_1(i)$ of the bit positions of $2^0$ and $2^1$, respectively.

In this case, through the above expression (1), the mark ratio $r_0$ of the first output data S107-1 is found as $r_0$=1/8×0+ 3/8×1+3/8×0+1/8×1=1/2. Similarly, the mark ratio $r_1$ of the second output data S107-2 is found as $r_1$=1/8×0+3/8×0+3/8× 1+1/8×1=1/2.

Figure 9:
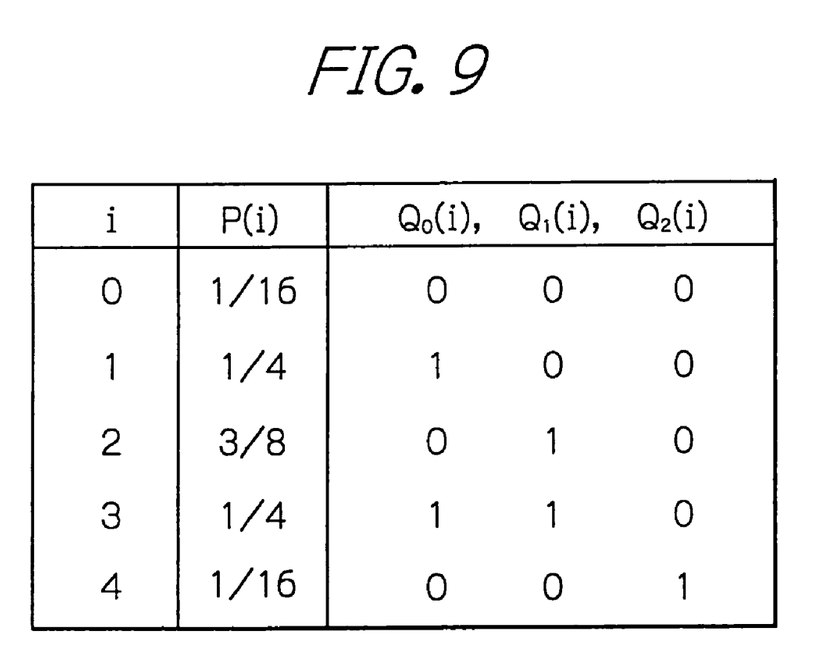

Next, the case of the number N of channels equal to four will be described. FIG. 9 shows the relationship between the amplitude level i, the probability P(i) of appearance of the amplitude level i and the values $Q_0(i)$, $Q_1(i)$, and $Q_2(i)$ of the bit positions of $2^0$, $2^1$, and $2^2$, respectively.

Through the above expression (1), in the case of N=4, the mark ratio $r_j$ is similarly calculated to find the mark ratio $r_0$ of the first output data S107-1 as $r_0$=1/2, the mark ratio $r_1$ of the second output data S107-2 as $r_1$=5/8, and the mark ratio $r_2$ of the third output data and S107-M as $r_2$=1/16.

Generally, a signal having a value of its mark ratio r other than 0.5 would include an offset caused by a direct current (DC) component, i.e. DC offset. Since the CDM signal then produced by the CDM signal transmitter would have a DC offset superimposed, the CDM signal S111 may would have a DC level changed.

DC offset is determined as a difference between the average voltage $V_a$ of an electric signal and its center voltage $V_c$. If the electric signal has an amplitude level J, and the probability of the signal, when having higher or lower voltage, is r or (1−r), respectively, then the average voltage $V_a$ of the signal would be given as $V_c$+0.5J×r−0.5J×(1−r)=$V_c$+J×(r− 0.5). Therefore, DC offset would be given as $V_a$−$V_c$=J×(r− 0.5).

With the example shown in FIG. 9, the amplitude level of the first amplified data S109-1 developed by the first amplifying circuit 42-1 is assumed to be equal to one, then the DC offset D(N) of the CDM signal would be calculated as D(4)= −1.5(=$2^0$×(1/2−0.5)+$2^1$×(5/8−0.5)+$2^2$×(1/16−0.5)).

Figure 10:
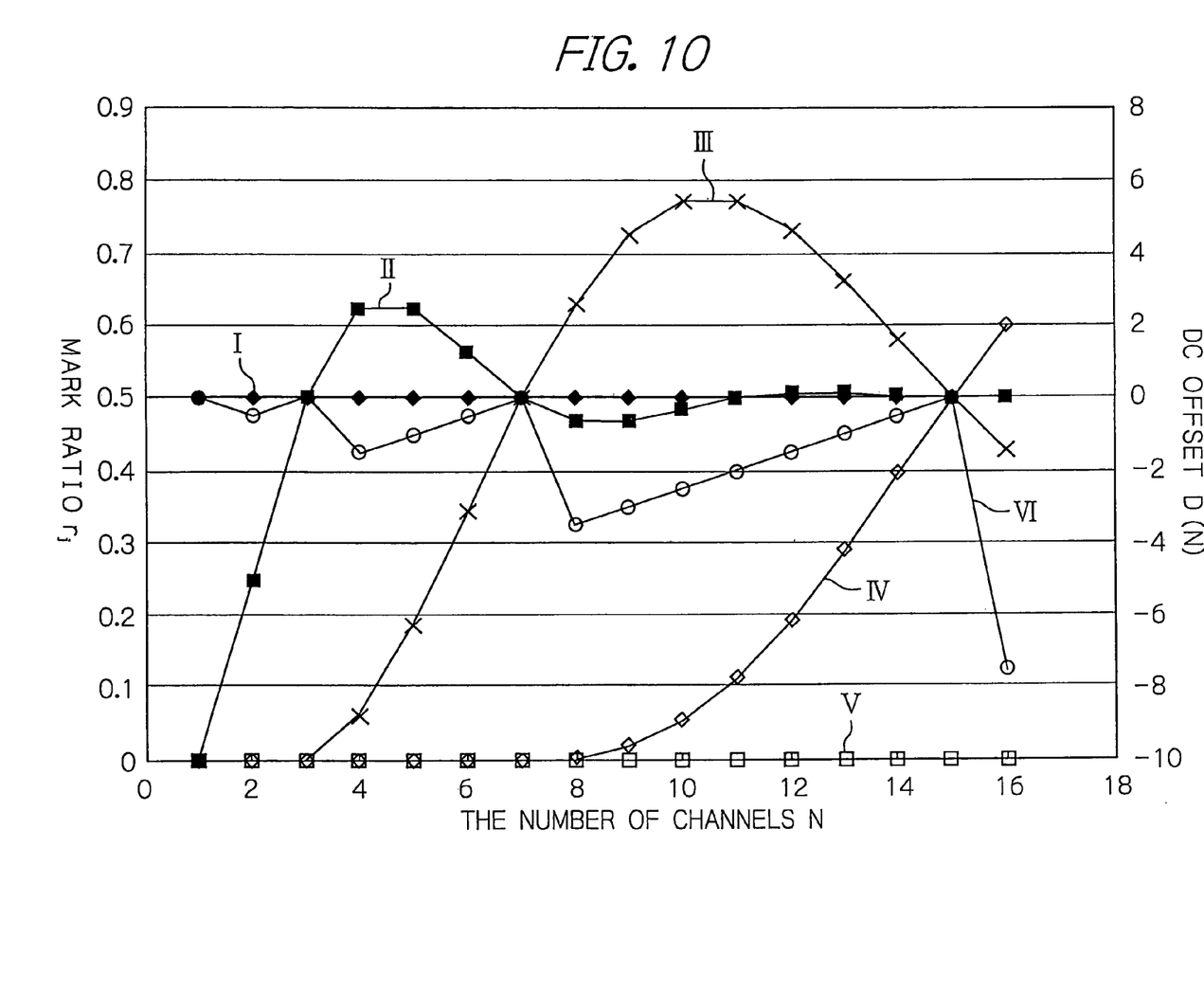
FIG. 10 is a graph plotting a mark ratios and the amount of an offset with respect to the number of channels, where an offset-adjusting value is not introduced.

FIG. 10 plots the mark ratio $r_j$ and the DC offset D(N) with respect to the number N of channels in the range of 1 to 16. In the figure, the horizontal axis represents the number N of channels, and the vertical axis represents the mark ratio $r_j$ and the DC offset D(N). The symbols I to V indicate the mark ratios $r_0$ to $r_4$ of bit positions of $2^0$ to $2^4$, respectively. A symbol VI indicates the DC offset D(N).

When the number N of channels satisfies N=$2^b$−1, where b is an integer, the mark ratio $r_j$ is equal to 0.5. Otherwise, namely, when the number N of channels does not satisfy N=$2^b$−1, the mark ratio $r_j$ has a value other than 0.5.

Since the mark ratio $r_j$ having a value other than 0.5 causes the DC offset D(N) to have a value other than "0", the level of the CDM signal S111 would be changed to cause an error in data.

In contrast to this, the arithmetic processor 30 and the amplifier 40 in accordance with the embodiment of the present invention use the offset-adjusting value A to produce output data and to set the amplitude level.

Figure 11:
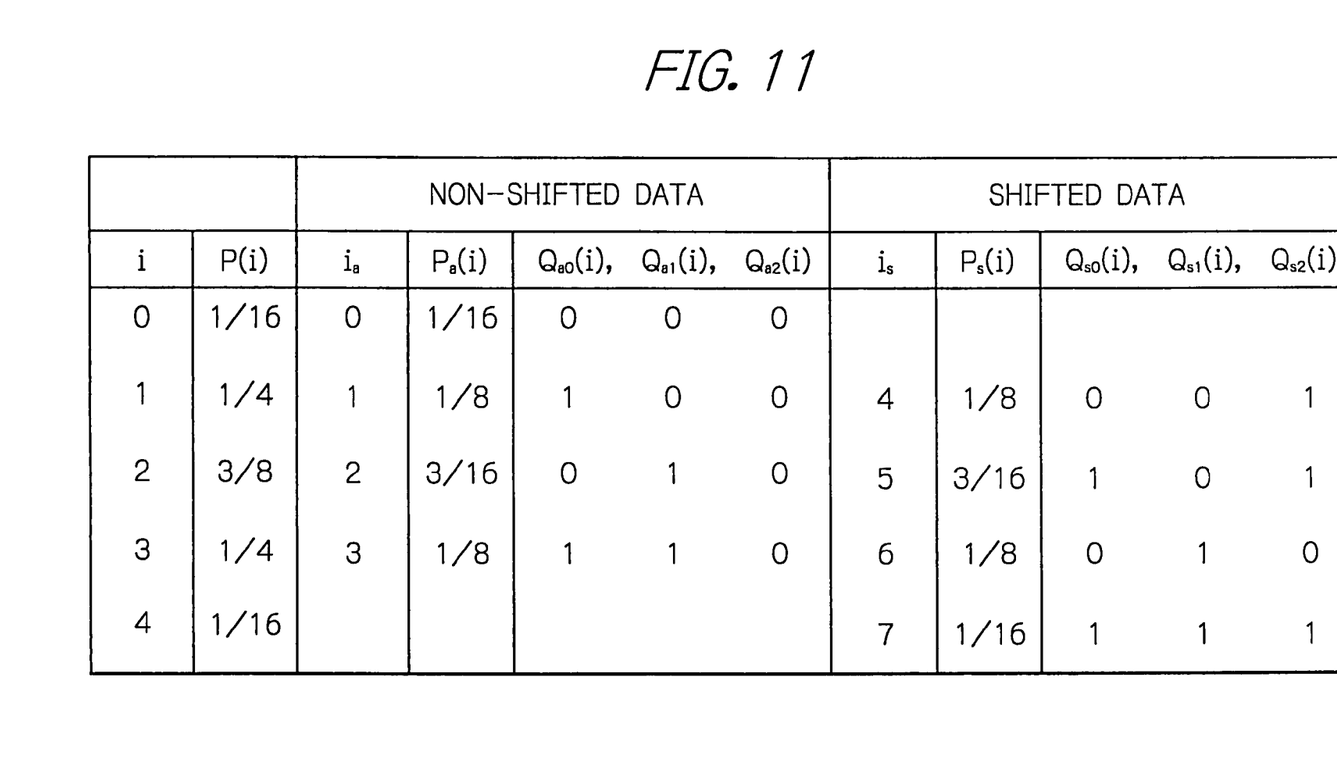
FIG. 11 shows an example of relationship between amplitude levels of added data, the probability of appearance of the amplitude level and output data, where an offset-adjusting value is introduced according to the invention.

FIG. 11 shows a corresponding relationship between the amplitude level i and the value $i_a$ of the non-shifted data, the probability $P_a(i)$ of appearance of the value $i_a$, the value $Q_{aj}(i)$ of the $2^j$'s place of the binary representation of the value $i_a$ of the non-shifted data, the value $i_s$ of the shifted data, the probability $P_s(i)$ of appearance of the value $i_s$ of the shifted data, and the value $Q_{sj}(i)$ of the of $2^j$'s place of the binary representation of the value $i_s$ of the shifted data, where j is an integer equal to or more than "0" but not exceeding M.

In this case, the mark ratio $r_j$ is represented by the following expression (2):

$$r_j = \sum_{i=0}^{2^{M-1}-1} P_a(i)Q_{aj}(i) + \sum_{i=2^{M-1}-A}^{N} P_s(i)Q_{sj}(i) \tag{2}$$

At this time, each of the mark ratios $r_0$, $r_1$, and $r_2$ of the first to third output data S107-1, S107-2 and S107-M, respectively, is found to be 1/2. Therefore, the DC offset does not occur.

In the case of the numbers N of channels having a value other than four, the mark ratio $r_j$ can also similarly be calculated to be always found as 1/2. Therefore, the code division multiplex signal transmitter can use the offset-adjusting value A to prevent the DC offset from occurring.

In addition, when the number N of channels satisfies the relationship, N=$2^b$−1, where b is an integer, the switcher 34 may be configured by always selecting the case 1. In this case, although the offset-adjusting value A is equal to "0" while the offset is not adjusted, the mark ratio $r_j$ is equal to 0.5.

The entire disclosure of Japanese patent application No. 2008-239433 filed on Sep. 18, 2008, including the specification, claims, accompanying drawings and abstract of the disclosure, is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A code division multiplex signal transmitter comprising:
an arithmetic processor for producing from a plurality N of channels of encoded data to be transmitted, where N is a natural number more than unity, pieces of output data, a number of which is equal to a number M of bit positions of a binary representation of a number of channels N, where M is a natural number;
an amplifier comprising amplifying circuits, of which a number is equal to the number M, wherein a k-th amplifying circuit amplifies k-th one of the output data, where k is a natural number less than M, to output k-th amplified data having an amplitude level of $2^{k-1}$, and M-th one of the amplifying circuits outputs M-th amplified data having an amplitude level of $2^{M-1}$−A, where A is an offset-adjusting value defined by A=$2^M$−(N+1); and
a multiplexer for multiplexing the first to M-th amplified data to develop a code division multiplex signal,
said arithmetic processor adding up the encoded data to thereby produce added data,
said arithmetic processor producing, when the added data is less than a first threshold value of $2^{M-1}$−A, the first to M-th output data representing values of respective bit positions of a binary representation of the added data,
said arithmetic processor selecting, when the added data is equal to or more than the first threshold value but is equal to or less than a second threshold value of $2^{M-1}$−1, either of the added data and shifted data, obtained by adding the offset-adjusting value A to the added data, at an equal probability to produce the first to M-th output data representing the values of the respective bit positions of the binary representation of the added data or shifted data selected, said arithmetic processor producing, when the added data is more than the second threshold value, the first to M-th output data representing the values of the respective bit positions of the binary representation of the shifted data.

2. The code division multiplex signal transmitter in accordance with claim 1, wherein said arithmetic processor comprises:

an adder for adding up the N channels of encoded data as the number to produce the added data;

a comparator for receiving the added data to compare the added data with the first threshold value and the second threshold value to produce a result of comparison;

a switcher operative in response to the result of comparison for receiving the added data from said adder; and a data shifter for adding the offset-adjusting value A to the added data to thereby produce shifted data; and a bit distributor for developing the first to M-th output data representing the values of the respective bit positions of the binary representation of the added data or shifted data, said switcher sending the added data to said bit distributor when the added data is less than the first threshold value, sending the added data to either said data shifter or said bit distributor at the equal probability when the added data is equal to or more than the first threshold value but does not exceed the second threshold value, and sending the added data to said data shifter when the added data is more than the second threshold value.

3. A code division multiplexing method comprising the steps of:

adding up a plurality N of channels of encoded data to be transmitted to produce added data, where N is a natural number more than unity;

comparing the added data with a first threshold value of $2^{M-1}-A$ and a second threshold value of $2^{M-1}-1$, where M is a number of bit positions of a binary representation of a number of channels N and A is an offset-adjusting value A defined by $2^M-(N+1)$;

producing first to M-th output data representing values of respective bit positions of a binary representation of the added data when the added data is less than the first threshold value according to a result of comparison;

selecting either of the added data and shifted data, obtained by adding the offset-adjusting value A to the added data, at an equal probability to produce the first to M-th output data representing the values of the respective bit positions of the binary representation of the added data or shifted data selected when the added data is equal to or more than the first threshold value but is equal to or less than the second threshold value according to the result of comparison;

producing the first to M-th output data representing the values of the respective bit positions of the binary representation of the shifted data when the added data is more than the second threshold value according to the result of comparison;

amplifying k-th one of the output data, where k is a natural number less than M, to output k-th amplified data having an amplitude level of $2^{k-1}$, and amplifying the M-th one of the output data to output M-th amplified data having an amplitude level of $2^{M-1}-A$; and multiplexing the first to M-th amplified data to develop a code division multiplex signal.

* * * * *